United States Patent
Zhu

(10) Patent No.: US 9,139,215 B2
(45) Date of Patent: Sep. 22, 2015

(54) INFANT STROLLER APPARATUS

(71) Applicant: Wanquan Zhu, Kowloon (HK)

(72) Inventor: Wanquan Zhu, Kowloon (HK)

(73) Assignee: NUNA INTERNATIONAL B.V. (NL)

(*) Notice: Subject to any disclaimer, the term of this patent is extended or adjusted under 35 U.S.C. 154(b) by 49 days.

(21) Appl. No.: 13/861,439

(22) Filed: Apr. 12, 2013

(65) Prior Publication Data
US 2013/0285353 A1 Oct. 31, 2013

(30) Foreign Application Priority Data

Apr. 26, 2012 (CN) .......................... 2012 2 0184632

(51) Int. Cl.
  B62B 9/28 (2006.01)
  B62B 9/12 (2006.01)
  B62B 7/00 (2006.01)
(52) U.S. Cl.
  CPC .. B62B 9/12 (2013.01); B62B 7/006 (2013.01)
(58) Field of Classification Search
  CPC ............ B62B 7/14; B62B 7/142; B62B 7/00; B62B 9/126; B60N 2/2848
  USPC .................................................. 280/658, 643
  See application file for complete search history.

(56) References Cited

U.S. PATENT DOCUMENTS

| | | | |
|---|---|---|---|
| 4,263,186 A | 4/1981 | Bluemel | |
| 5,676,386 A * | 10/1997 | Huang | 280/30 |
| D396,025 S * | 7/1998 | Morrone | D12/129 |
| 5,865,447 A * | 2/1999 | Huang | 280/30 |
| 6,241,274 B1 * | 6/2001 | Huang | 280/642 |
| 6,302,412 B1 * | 10/2001 | Worth et al. | 280/30 |
| 6,398,233 B1 * | 6/2002 | Liang et al. | 280/30 |
| 6,863,286 B2 * | 3/2005 | Eros et al. | 280/47.38 |
| 6,893,040 B2 * | 5/2005 | Hou et al. | 280/642 |
| 6,923,467 B2 * | 8/2005 | Hsia | 280/648 |
| 7,017,921 B2 * | 3/2006 | Eros | 280/47.38 |
| 7,070,197 B2 * | 7/2006 | Chen | 280/642 |
| 7,464,957 B2 * | 12/2008 | Worth et al. | 280/642 |
| 7,513,512 B2 * | 4/2009 | Yoshie et al. | 280/47.38 |
| 7,624,954 B2 * | 12/2009 | Randle et al. | 248/129 |
| 7,686,322 B2 * | 3/2010 | Longenecker et al. | 280/642 |
| 8,172,253 B2 * | 5/2012 | Song | 280/642 |
| 8,240,700 B2 * | 8/2012 | Greger et al. | 280/648 |
| 8,382,150 B2 * | 2/2013 | Williams et al. | 280/648 |

(Continued)

FOREIGN PATENT DOCUMENTS

| | | | |
|---|---|---|---|
| EP | 1591339 A2 | 11/2005 | |
| GB | 2500779 A | 10/2013 | |

*Primary Examiner* — Hau Phan
*Assistant Examiner* — Jacob Meyer
(74) *Attorney, Agent, or Firm* — David I. Roche; Baker & McKenzie LLP

(57) ABSTRACT

An infant stroller apparatus includes a stroller frame having a push handle, a child safety seat installed with the stroller frame, and a restraint system for holding the child safety seat with the stroller frame. The restraint system includes a holding structure disposed at a transversal position and near a rear portion of the child safety seat, and two first and second abuttal arrangements provided symmetrically at left and right sides of the child safety seat. Each first abuttal arrangement includes a bearing surface carried by one side segment, and a protruding structure connected with the child safety seat that rests on the bearing surface. The second abuttal arrangements are disposed near the front portion of the child safety seat to prevent the child safety seat from moving in a direction that raises the protruding structures out of contact with the bearing surfaces.

18 Claims, 6 Drawing Sheets

(56) References Cited

U.S. PATENT DOCUMENTS

| | | | |
|---|---|---|---|
| 8,585,075 B2* | 11/2013 | Zhong | 280/648 |
| 8,727,370 B2* | 5/2014 | Tsai | 280/648 |
| 2001/0040357 A1* | 11/2001 | Barrett et al. | 280/648 |
| 2004/0094922 A1* | 5/2004 | Eros | 280/47.38 |
| 2004/0094923 A1* | 5/2004 | Eros et al. | 280/47.38 |
| 2004/0113469 A1* | 6/2004 | Yeh | 297/183.1 |
| 2004/0124611 A1* | 7/2004 | Gong et al. | 280/642 |
| 2005/0242535 A1* | 11/2005 | Chen | 280/47.38 |
| 2005/0242549 A1* | 11/2005 | Longenecker et al. | 280/642 |
| 2006/0119079 A1* | 6/2006 | Yoshie et al. | 280/648 |
| 2007/0057486 A1* | 3/2007 | Worth et al. | 280/647 |
| 2008/0079293 A1* | 4/2008 | Hedges et al. | 297/216.11 |
| 2008/0136233 A1* | 6/2008 | Randle et al. | 297/250.1 |
| 2009/0127827 A1* | 5/2009 | Pike et al. | 280/648 |
| 2010/0171289 A1* | 7/2010 | Greger et al. | 280/648 |
| 2010/0230933 A1* | 9/2010 | Dean et al. | 280/647 |
| 2011/0084468 A1* | 4/2011 | Li | 280/658 |
| 2011/0163518 A1* | 7/2011 | Song | 280/642 |
| 2011/0175305 A1* | 7/2011 | Chen et al. | 280/30 |
| 2012/0286497 A1* | 11/2012 | Tsai | 280/647 |
| 2013/0062923 A1* | 3/2013 | Zhu | 297/423.26 |
| 2013/0075992 A1* | 3/2013 | Zhu | 280/47.38 |
| 2013/0257022 A1* | 10/2013 | Li | 280/658 |
| 2013/0292923 A1* | 11/2013 | Burchi | 280/647 |

* cited by examiner

INFANT STROLLER APPARATUS

CROSS-REFERENCE TO RELATED APPLICATION

This application claims priority to Chinese Patent Application No. 201220184632.4, filed on Apr. 26, 2012, the entirety of which is incorporated herein by reference.

BACKGROUND

1. Field of the Invention

The present inventions relate to infant stroller apparatuses.

2. Description of the Related Art

Current safety legislations require the use of a child safety seat for seating a young child in a vehicle. The seatbelt or an anchorage fixture of the vehicle can be used to secure the child safety seat which has a harness more adapted to restrain and protect the young child. The child safety seat can also be easily portable, which allows the caregiver to detach the child safety seat from the anchorage fixture and take it away from the vehicle with the child sitting thereon.

Many available products also have a frame structure that can receive the placement of the child safety seat, such as infant swings, infant strollers and the like. This may permit a versatile use of the child safety seat for transporting the child: for example, the child safety seat can be transferred directly from the vehicle to the stroller frame, without disturbing the child continuously sitting on the child safety seat.

While the current frame structures of the aforementioned products allow convenient placement of the child safety seat, there is still a need for improved designs that can hold the child safety in a more secure manner on the frame structure.

SUMMARY

The present application describes an infant stroller apparatus that can receive the installation of a child safety seat in a convenient and secure manner. In one embodiment, the infant stroller apparatus can include a stroller frame including a push handle that has two side segments, a child safety seat that is installed with the stroller frame through a gap between the two side segments, and a restraint system for holding the child safety seat with the stroller frame. The child safety seat has a rear and front portion. The restraint system includes a holding structure disposed at a transversal position between the two side segments and near the rear portion of the child safety seat, and two first abuttal arrangements and two second abuttal arrangements provided symmetrically at left and right sides of the child safety seat. The holding structure includes an anchor frame assembled with the stroller frame, and a catch member provided on the child safety seat and operable to engage with the anchor frame. Each of the first abuttal arrangements includes a bearing surface carried by one of the two side segments and facing upward, and a protruding structure projecting laterally outward from a side surface of the child safety seat and resting on the bearing surface. The second abuttal arrangements are disposed spaced apart from the first abuttal arrangements and near the front portion of the child safety seat to prevent the child safety seat from moving in a direction that raises the protruding structures out of contact with the bearing surfaces.

DETAILED DESCRIPTION OF THE EMBODIMENTS

Figure 1:
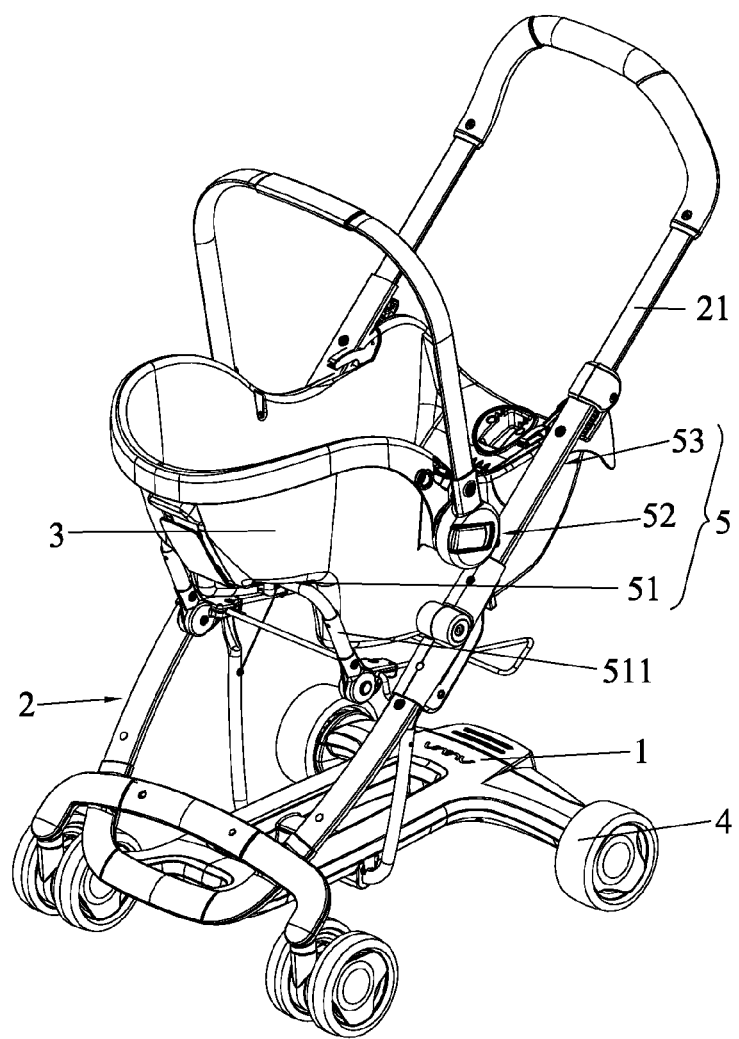
FIG. 1 is a perspective view illustrating an embodiment of an infant stroller apparatus.
Figure 2:
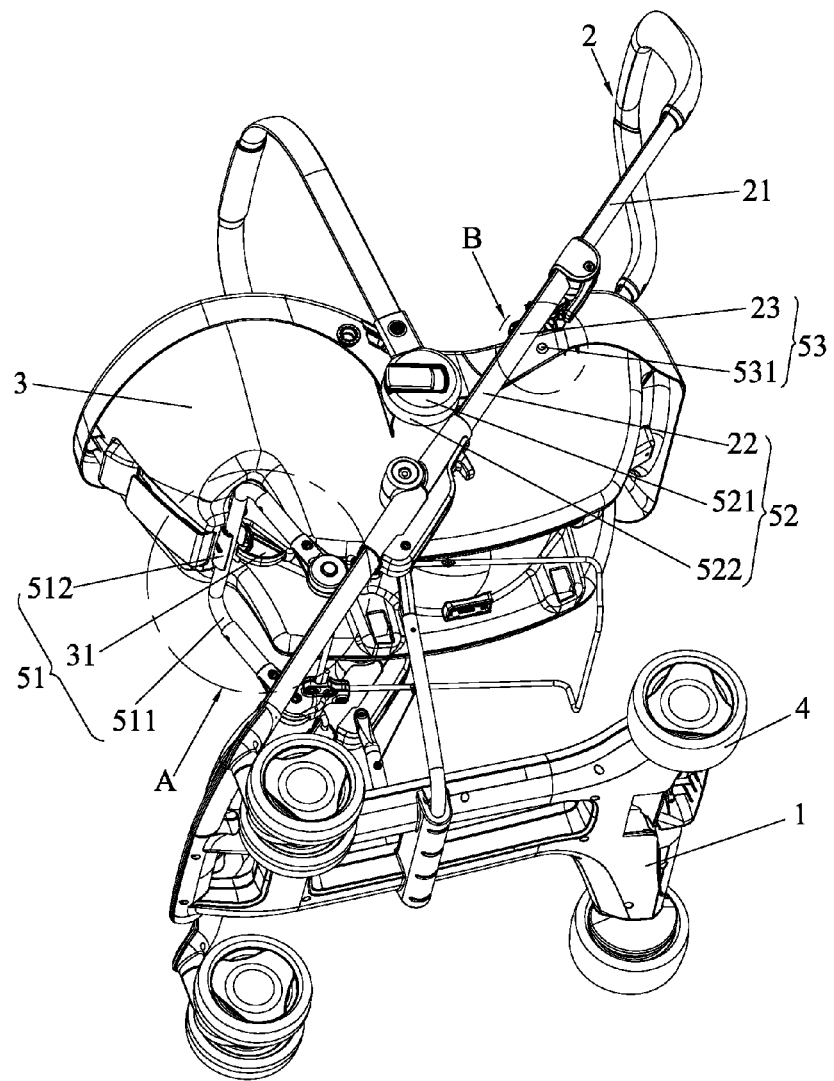
FIG. 2 is another perspective view of the infant stroller apparatus shown FIG. 1.

FIGS. 1 and 2 are perspective views illustrating an embodiment of an infant stroller apparatus. The infant stroller apparatus can include a stroller frame having a base 1, and a collapsible support frame 2 assembled with the base 1 and projecting upward from the base 1. The base 1 can be assembled with a plurality of wheels 4 for facilitating displacement of the infant stroller apparatus. The infant stroller apparatus can further include a child safety seat 3 that can detachably assemble with the stroller frame, in particular with the support frame 2 of the stroller frame. For this purpose, a restraint system 5 described in more details hereafter may be provided to securely hold the child safety seat 3 with the stroller frame.

Referring again to FIGS. 1 and 2, the support frame 2 can include a push handle of a substantially U-shape having left and right side segments 21 spaced apart from each other. The child safety seat 3 can be disposed in a gap defined between the side segments 21 of the push handle, and rest in contact with the side segments 21. The side segments 21 can act to prevent lateral displacement of the child safety seat 3.

The child safety seat 3 can receive the placement of a child, and can attach with a vehicle seat for seating the child in the vehicle. The child safety seat 3 can have a rear portion corresponding to the side of its backrest, and a front portion corresponding to an opposite side of the seat where the legs of the child are placed. When it is not used in the vehicle, the child safety seat 3 can be installed with the stroller frame in a position facing rearward (i.e., facing the caregiver pushing the stroller apparatus) as shown in FIGS. 1 and 2. The child safety seat 3 can be securely held with the stroller frame via the restraint system 5.

With reference to FIGS. 1 and 2, the restraint system 5 can include a holding structure 51, and first and second abuttal arrangements 52 and 53. The holding structure 51 can be disposed at a transversal position in an area between the two side segments 21, and can be operable to securely attach the rear portion of the child safety seat 3 with the support frame 2. When the child safety seat 3 is installed on the support frame 2 facing rearward, the first and second abuttal arrangements 52 and 53 can be spaced apart from the holding structure 51 along a lengthwise axis of the child safety seat 3 that extends from the rear portion to the front portion of the child safety seat 3. A same set of the first and second abuttal arrangements 52 and 53 can be provided symmetrically at each of the left and right sides of the child safety seat 3. The first and second abuttal arrangements 52 and 53 can interact with the side segments 21 to hold the child safety seat 3 in place and block its rotation parallel to a vertical plane.

Figure 3:
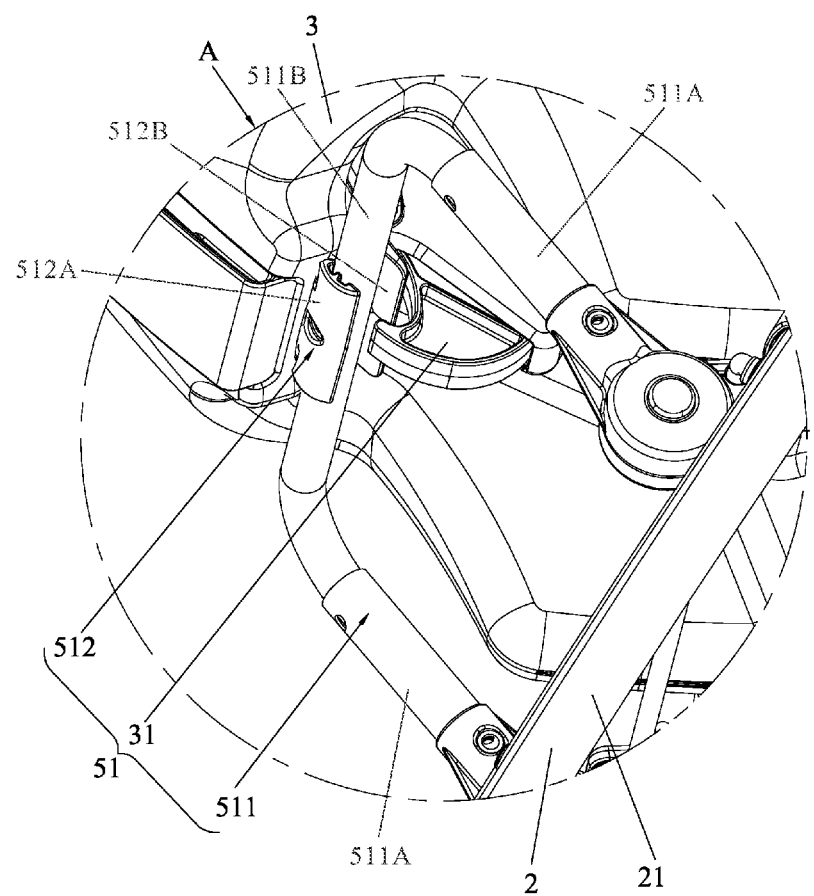
FIG. 3 is a schematic enlarged view of portion A shown in FIG. 2.

FIG. 3 is a schematic enlarged view of portion A shown in FIG. 2 that illustrates the holding structure 51. The holding structure 51 can include an anchor frame 511 provided on the support frame 2, and a catch member 31 provided on the child safety seat 3. The anchor frame 511 can be disposed in front of the push handle. The anchor frame 511 can have a U-shape including two side portions 511A respectively assembled pivotally with the support frame 2, and a transversal segment 511B joined with the two side portions 511A and affixed with a sleeve 512. The transversal segment 511B of the anchor frame 511 can extend parallel to a width of the stroller frame.

The sleeve 512 can have a curved shape that wraps at least partially around the transversal segment 511B of the anchor frame 511, and can be opened at an underside. The sleeve 512 can include two sidewalls 512A and 512B disposed adjacent to two opposite sides of the transversal segment 511B of the anchor frame 511.

The catch member 31 can be formed with a hook shape, and can be pivotally assembled with a shell body of the child safety seat 3. When the child safety seat 3 is installed on the support frame 2 facing rearward, the rear portion of the child safety seat 3 can rest on the transversal segment 511B of the anchor frame 511. Moreover, the catch member 31 can engage with the sleeve 512 from the underside, e.g., the hook shape of the catch member 31 can partially wrap around the sidewall 512B. The engagement of the catch member 31 with the sleeve 512 can securely hold the rear portion of the child safety seat 3 with the anchor frame 511, and prevent back and forth displacement of the child safety seat 3.

Referring again to FIG. 2, the first abuttal arrangements 52 can be located at an intermediate region of the child safety seat 3 between its rear portion and its front portion. Each of the two first abuttal arrangements 52 can include a first protruding structure 521 provided on the child safety seat 3, and a bearing surface 22 provided on the support frame 2. The first protruding structure 521 can project laterally outward from a side surface of the child safety seat 3. In one embodiment, the child safety seat 3 can include a carrying handle 34 for facilitating its portability, and the protruding structure 521 can be formed by an outer housing used in a pivot connection between the carrying handle 34 and the shell body of the child safety seat 3. The bearing surface 22 can be defined as an external surface of one side segment 21 that faces upward. The transversal distance between the two protruding structures 521 on the left and right sides of the child safety seat 3 is greater than the gap between the two side segments 21 of the push handle. Accordingly, when the child safety seat 3 is installed on the support frame 2 facing rearward, the two protruding structures 521 on the left and right sides of the child safety seat 3 can respectively rest in contact against the bearing surfaces 22. The holding structure 51 and the two first abuttal arrangements 52 can thereby provide three support positions for sustaining the weight of the child safety seat 3 on the support frame 2.

In some embodiments, an anti-slip interface 522 may also be provided at the contact between each protruding structure 521 and the bearing surface 22 adjacent thereto. The anti-slip interface 522 may include a surface on the protruding structure 521 (as shown), a surface on the side segment 21, or on contact surfaces on both the protruding structure 521 and the side segment 21. Examples of materials used for the anti-slip interface 522 can include rubber, or any adequate materials that can produce high friction contact between the protruding structure 521 and the bearing surface 22 of the side segment 21 to prevent slipping displacement of the child safety seat 3 relative to the push handle of the support frame 2.

Figure 4:
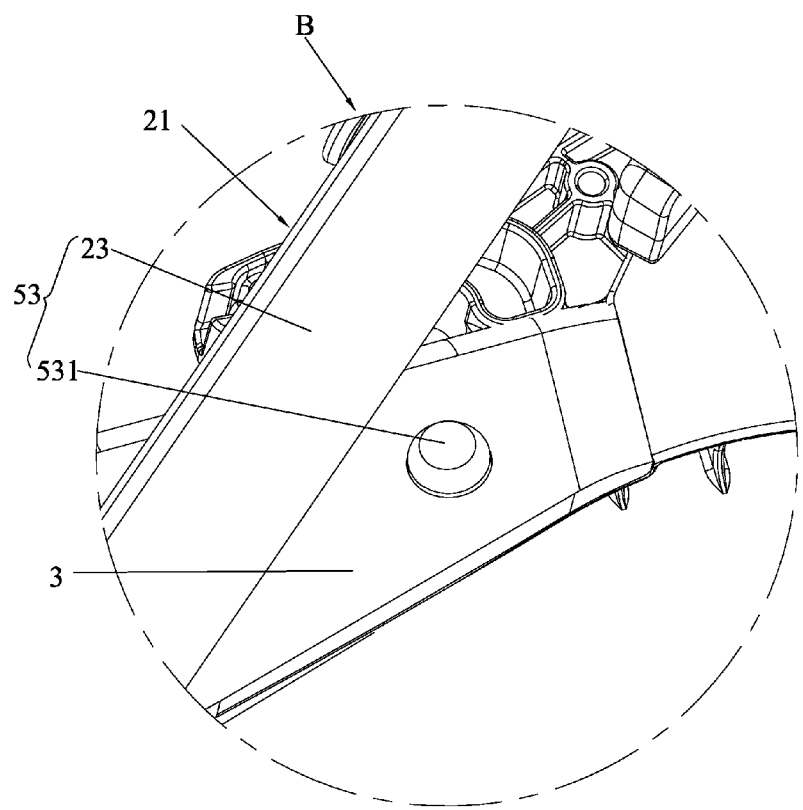
FIG. 4 is a schematic enlarged view of portion B shown in FIG. 2.

FIG. 4 is a schematic enlarged view of portion B shown in FIG. 2 that illustrates one of the two second abuttal arrangements 53. When the child safety seat 3 is installed on the support frame 2 of the stroller apparatus, the second abuttal arrangements 53 are located near the front portion of the child safety seat 3. Each of the second abuttal arrangements 53 can include a protrusion 531 connected with the child safety seat 3, and a stop surface 23 provided on the support frame 2. The protrusion 531 can project laterally outward from a side surface of the child safety seat 3, and near its front portion. The stop surface 23 can be defined as an external surface of one side segment 21 that faces downward. When the child safety seat 3 is installed on the support frame 2 facing rearward, the protrusions 531 at the left and right sides of the child safety seat 3 can be respectively positioned adjacently below the stop surfaces 23. Because the transversal distance between the two protrusions 531 on the left and right sides of the child safety seat 3 is greater than the gap between the two side segments 21 of the push handle, the protrusions 531 can respectively abut against the stop surfaces 23 to prevent the front portion of the child safety seat 3 from rotating upward parallel to a vertical plane.

With the restraint system 5 described herein, the holding structure 51 and the two first abuttal arrangements 52 can provide support for the child safety seat 3 on the support frame 2. Moreover, the protruding structure 521 and the protrusion 531 at each of the left and right sides are disposed respectively above and below the side segment 21, and are spaced apart from each other along the side segment 21. This placement of the protrusions 531 can prevent pivotal displacement of the child safety seat 3 in a direction that raises the protruding structures 521 out of contact with the bearing surfaces 22.

When the child safety seat 3 is to be removed from the support frame 2, an actuator (not shown) on the child safety seat 3 can be operated to drive displacement of the catch member 31 and cause it to disengage from the anchor frame 511. The rear portion of the child safety seat 3 then can be raised away from the side segments 21 of the push handle so as to disengage the first and second abuttal arrangements 52 and 53. The child safety seat 3 can be thereby removed from the support frame 2 of the infant stroller apparatus.

Figure 5:
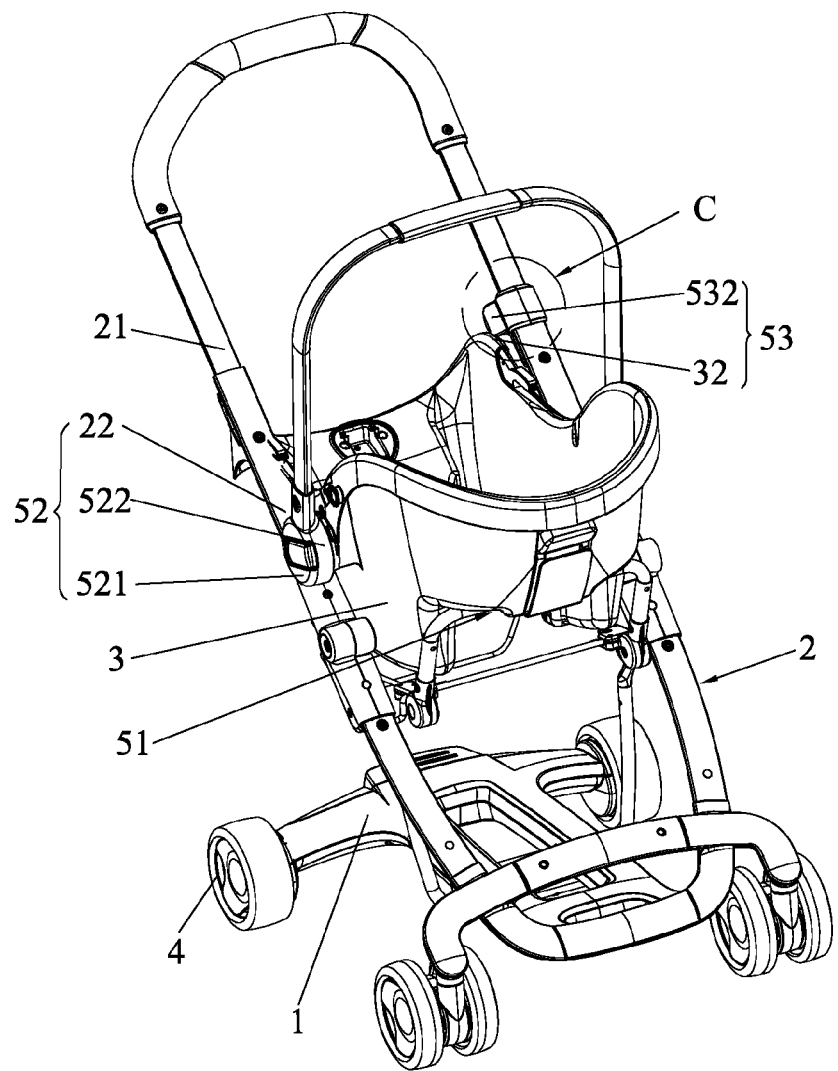
FIG. 5 is a perspective view illustrating another embodiment of the infant stroller apparatus.
Figure 6:
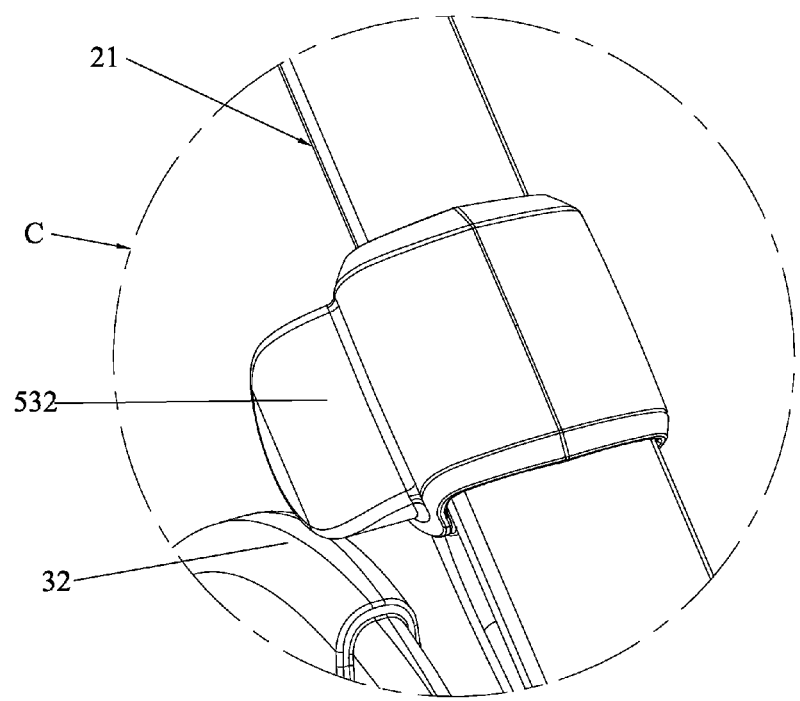
FIG. 6 is a schematic enlarged view of portion C shown in FIG. 5.

FIG. 5 is a schematic view illustrating a variant embodiment of the infant stroller apparatus, and FIG. 6 is a schematic enlarged view of portion C shown in FIG. 5. The embodiment shown in FIG. 5 is substantially similar to that described previously, one main difference lying in the configuration of the second abuttal arrangements 53.

In the embodiment shown in FIGS. 5 and 6, each of the second abuttal arrangements 53 at the left and right sides respectively includes a protrusion 532 that is connected with and projects inward (i.e., toward the child safety seat 3) from one side segment 21, and a stop surface 32 that is defined as an upper surface of the child safety seat 3 facing upward (as shown in FIG. 5) and is located adjacent to the protrusion 532. When the child safety seat 3 is installed on the support frame 2, the protrusions 532 at the left and right sides of the child safety seat 3 can be respectively positioned adjacently above the stop surfaces 32 to prevent the front portion of the child safety seat 3 from rotating upward in a direction that raises the protruding structure 521 out of contact with the bearing surface 22.

Advantages of the structures described herein include the ability to install a child safety seat on a stroller frame in a convenient, and to hold the child safety seat securely with the stroller frame.

Realizations of the infant stroller apparatuses have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
a stroller frame including a push handle that has two side segments;
a child safety seat having a rear portion and a front portion, the child safety seat being installed with the stroller frame through a gap between the two side segments; and
a restraint system for holding the child safety seat with the stroller frame, wherein the restraint system includes:
a holding structure disposed at a transversal position between the two side segments and adjacent to the rear portion of the child safety seat, wherein the holding structure includes an anchor frame assembled with the stroller frame, and a catch member provided on the child safety seat and operable to engage with the anchor frame;
two first abuttal arrangements respectively provided symmetrically at a left and a right side of the child safety seat, wherein each of the first abuttal arrangements includes a bearing surface provided on one of the two side segments and facing upward, and a protruding structure projecting laterally outward from a side surface of the child safety seat, the protruding structure being supported on the bearing surface through a contact between the protruding structure and the bearing surface, whereby the two side segments of the push handle provide support to the child safety seat; and
two second abuttal arrangements respectively provided symmetrically at the left and right sides of the child safety seat, wherein the second abuttal arrangements are disposed spaced apart from the first abuttal arrangements and near the front portion of the child safety seat to prevent the child safety seat from moving in a direction that raises the protruding structures out of contact with the bearing surfaces, each of the second abuttal arrangements including a protrusion projecting laterally outward from a side surface of the child safety seat, and a stop surface defined as an external surface of one side segment facing downward and located adjacent to the protrusion.

2. The infant stroller apparatus according to claim 1, wherein the catch member is disposed at an underside of the child safety seat.

3. The infant stroller apparatus according to claim 1, wherein at least one of the two first abuttal arrangements further includes an anti-slip interface provided at the contact between each of the protruding structures and the bearing surface adjacent thereto.

4. The infant stroller apparatus according to claim 1, wherein the child safety seat includes a carrying handle, and each of the protruding structures is formed by an outer housing used in a pivot connection between the carrying handle and a shell body of the child safety seat.

5. The infant stroller apparatus according to claim 1, wherein the protruding structure and the protrusion at each of the left and right sides of the child safety seat are disposed respectively above and below the side segment, and are spaced apart from each other along the side segment.

6. The infant stroller apparatus according to claim 1, wherein the stop surface is adapted to contact with the protrusion to block upward rotation of the front portion of the child safety seat.

7. The infant stroller apparatus according to claim 1, wherein the child safety seat is installed with the stroller frame in a position facing rearward.

8. The infant stroller apparatus according to claim 1, wherein the bearing surface in each of the first abuttal arrangements is an external surface of one side segment.

9. An infant stroller apparatus comprising:
a stroller frame including a push handle that has two side segments;
a child safety seat having a rear portion and a front portion, the child safety seat being installed with the stroller frame through a gap between the two side segments; and
a restraint system for holding the child safety seat with the stroller frame, wherein the restraint system includes:
a holding structure disposed at a transversal position between the two side segments and adjacent to the rear portion of the child safety seat, wherein the holding structure includes an anchor frame assembled with the stroller frame, and a catch member provided on the child safety seat and operable to engage with the anchor frame, the anchor frame being pivotally connected with the stroller frame;
two first abuttal arrangements respectively provided symmetrically at a left and a right side of the child safety seat, wherein each of the first abuttal arrangements includes a bearing surface carried by one of the two side segments and facing upward, and a protruding structure projecting laterally outward from a side surface of the child safety seat that rests on the bearing surface, whereby the two side segments of the push handle provide support to the child safety seat; and
two second abuttal arrangements respectively provided symmetrically at the left and right sides of the child safety seat, wherein the second abuttal arrangements are disposed spaced apart from the first abuttal arrangements and near the front portion of the child safety seat to prevent the child safety seat from moving in a direction that raises the protruding structures out of contact with the bearing surfaces, each of the second abuttal arrangements including a protrusion projecting laterally outward from a side surface of the child safety seat, and a stop surface defined as an external surface of one side segment facing downward and located adjacent to the protrusion.

10. The infant stroller apparatus according to claim 9, wherein the anchor frame has a U-shape including two side portions that are respectively assembled pivotally with the stroller frame, and a transversal segment affixed with a sleeve.

11. The infant stroller apparatus according to claim 10, wherein the sleeve has a curved shape that at least partially wraps around the transversal segment of the anchor frame and is opened at an underside, the sleeve including two sidewalls respectively disposed adjacent to two opposite sides of the transversal segment of the anchor frame.

12. The infant stroller apparatus according to claim 11, wherein the catch member engages with the sleeve from an underside of the sleeve.

13. The infant stroller apparatus according to claim 9, wherein the protruding structure and the protrusion at each of the left and right sides of the child safety seat are disposed respectively above and below the side segment, and are spaced apart from each other along the side segment.

14. The infant stroller apparatus according to claim 9, wherein the stop surface contacts with the protrusion to block upward rotation of the front portion of the child safety seat.

15. An infant stroller apparatus comprising:
a stroller frame including a push handle that has two side segments;

a child safety seat having a rear portion and a front portion, the child safety seat being installed with the stroller frame through a gap between the two side segments; and a restraint system for holding the child safety seat with the stroller frame, wherein the restraint system includes:

a holding structure disposed at a transversal position between the two side segments and adjacent to the rear portion of the child safety seat, wherein the holding structure includes an anchor frame assembled with the stroller frame, and a catch member provided on the child safety seat and operable to engage with the anchor frame;

two first abuttal arrangements respectively provided symmetrically at left and right sides of the child safety seat, wherein each of the first abuttal arrangements includes a bearing surface provided on one of the two side segments and facing upward, and a protruding structure projecting laterally outward from a side surface of the child safety seat that rests on the bearing surface, whereby the child safety seat is supported at least partially by the two side segments of the push handle; and two second abuttal arrangements respectively provided symmetrically at the left and right sides of the child safety seat, wherein the second abuttal arrangements are disposed spaced apart from the first abuttal arrangements and near the front portion of the child safety seat, each of the second abuttal arrangements including a blocking surface arranged on one of the two side segments and a protrusion projecting laterally outward from a side surface of the child safety seat, the blocking surface being defined as an external surface of one side segment facing downward and located adjacent to the protrusion, the blocking surface being capable of contacting against a portion of the child safety seat to prevent upward rotation of the front portion of the child safety seat, and the protruding structure and the protrusion at each of the left and right sides of the child safety seat being disposed spaced apart from each other along the side segment and respectively above and below the side segment.

16. The infant stroller apparatus according to claim 15, wherein at least one of the two first abuttal arrangements further includes an anti-slip interface provided at a contact between each of the protruding structures and the bearing surface adjacent thereto.

17. The infant stroller apparatus according to claim 15, wherein the child safety seat includes a carrying handle, and each of the protruding structures is formed by an outer housing used in a pivot connection between the carrying handle and a shell body of the child safety seat.

18. The infant stroller apparatus according to claim 15, wherein the blocking surface is adapted to contact against the protrusion to block upward rotation of the front portion of the child safety seat.

* * * * *